Dec. 2, 1941.   W. W. HALLINAN   2,264,974
VARIABLE SPEED PULLEY
Original Filed Jan. 13, 1940   2 Sheets-Sheet 1
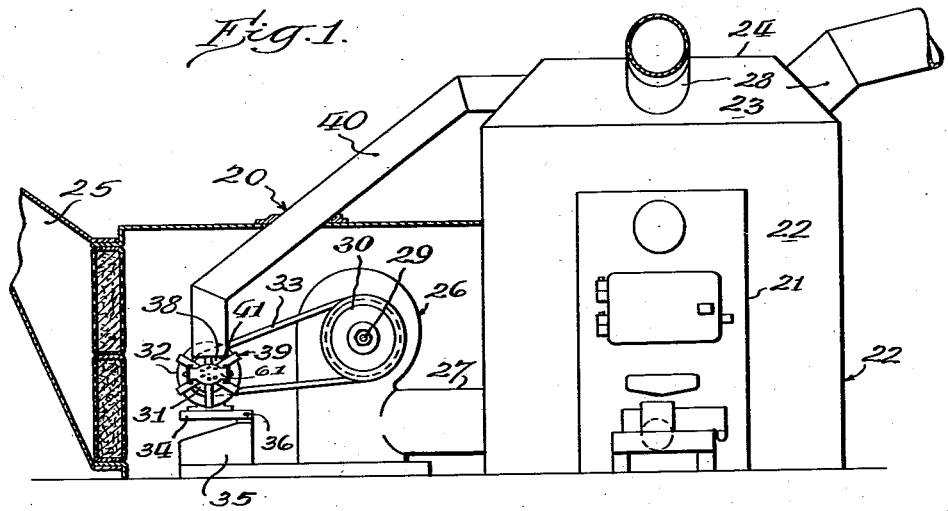
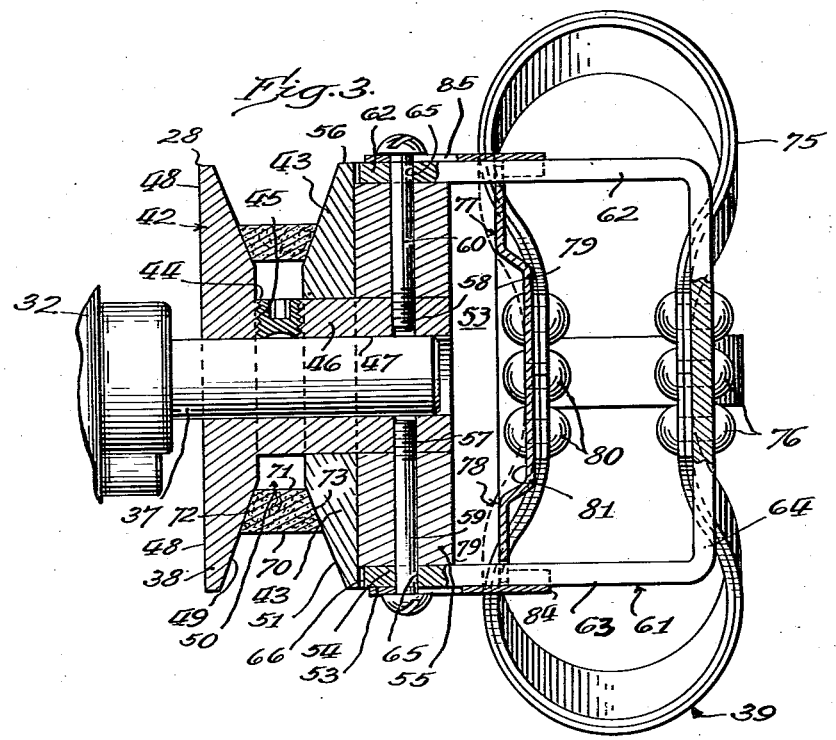
Inventor
William W. Hallinan
By McCaal & Hendt
Attys.

Dec. 2, 1941.  W. W. HALLINAN  2,264,974
VARIABLE SPEED PULLEY
Original Filed Jan. 13, 1940   2 Sheets-Sheet 2
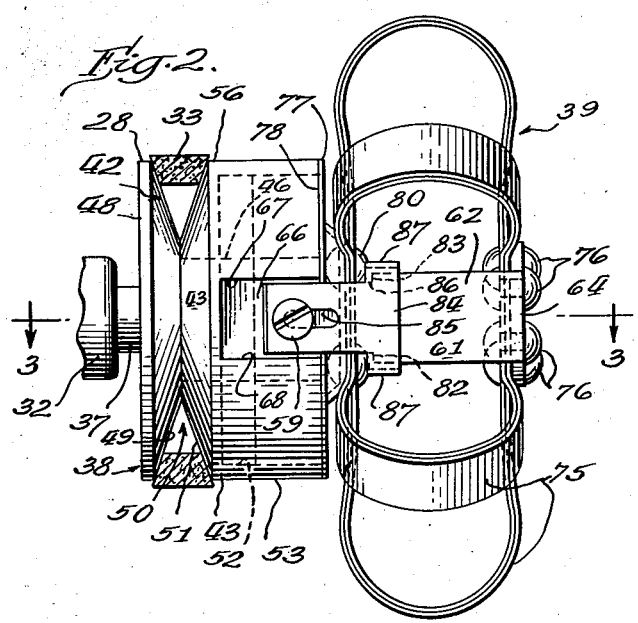
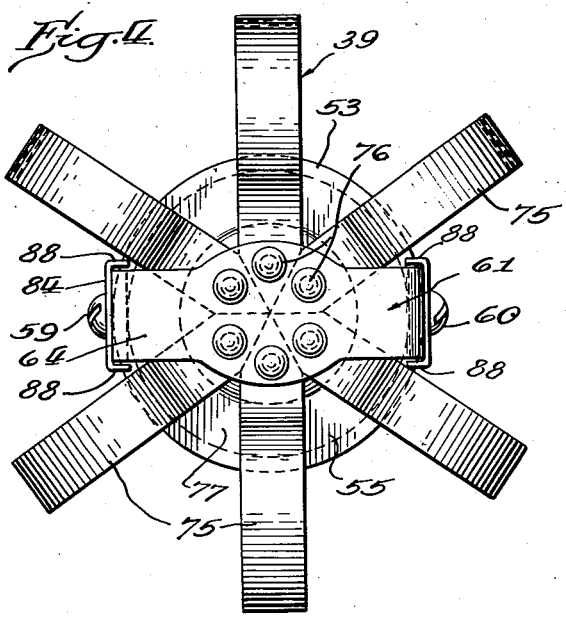
Inventor.
William W. Hallinan Patented Dec. 2, 1941

2,264,974

UNITED STATES PATENT OFFICE 2,264,974

VARIABLE SPEED PULLEY

William W. Hallinan, Mendota, Ill.

Original application January 13, 1940, Serial No. 313,673. Divided and this application January 22, 1941, Serial No. 375,394

18 Claims. (Cl. 74—230.17)

The present invention relates to variable speed pulleys, and is particularly concerned with variable speed pulleys controlled responsive to variations in pressure or temperature, and adapted to provide a continuously and uniformly varying change of speed if used as a driven or driving member.

The present application—as is also my application No. 375,393 filed Jan. 22, 1941—is a division of my application, Serial No. 313,673, filed January 13, 1940, which is in turn a continuation-in-part of my prior application, Serial No. 196,003, filed March 15, 1938, for Variable speed pulleys, Patent No. 2,210,976, issued August 13, 1940.

The variable speed pulleys constructed according to the present invention are capable of many different applications. For example, they may be used for controlling the speed of a conveyor for conveying articles to be treated with heat, through a heated or drying atmosphere, or they may be used as a drive in a refrigerator system in which the temperature controls the speed of a compressor or a circulating fan.

One of the most important applications of my variable speed pulley as it now appears to me is in the application of the pulley to the circulation of air in heating or air conditioning systems. For example, according to the methods of the prior art, air conditioning systems are provided with standard pulleys, the parts of which are manually adjustable, so as to give the driven member a predetermined speed, and the pulleys on the motor and fan are so adjusted relative to each other to bring in sufficient air to take care of the maximum heating load.

Under these conditions it is necessary to set the thermal control for the switch which controls the fan motor at about 175 degrees F., although it is sometimes set at 150 degrees F., and these relatively high temperatures are necessary to prevent the blowing of a blast of cold air by the circulating fan.

If the thermal control for the circulating fan motor is set at a lower temperature, the fan will start to operate before the bonnet of the furnace has been heated to a sufficient temperature to heat the air which is circulated by the fan.

Under these conditions of the prior art I have found that the fan motor starts and shuts off a number of times before it starts to run regularly to circulate the air. For example, the fan may start and run for a minute or so and then shut off, for the reason that as soon as the fan motor is started the cold air, which is brought in at the maximum pulley speed, cools off the bonnet and thermal control and immediately shuts the fan off again.

This is not a desirable mode of operation.

One of the objects of the present invention is the provision of an improved variable speed pulley and heating system, in which this intermittent action of the fan is eliminated, and in which it is not necessary to operate the furnace at such a high bonnet temperature. A lowering of the operating temperature is less wasteful of fuel, and more economical.

Another object of the invention is the provision of an improved variable speed pulley and heating system, in which the furnace may be operated at a lower temperature and within a smaller range of temperature variation for the purpose of maintaining a more uniform temperature in the space to be supplied with heated air, and in order to operate the system more efficiently.

According to the practices of the prior art, furnaces which are provided with ordinary constant speed driving pulleys on their motors and circulating fans require a heating to a temperature which is too high from several points of view. In such cases it is either necessary to have the fan motor turned off to stop circulation, when the furnace burner is turned off, or the temperature will overrun that required if the fan continues to operate because the fan continues to use up the heat after the burner has stopped.

According to the present invention, the operation of the air and circulating fan is not wholly dependent upon the time of operation of the oil burner, as the air circulating fan may operate, depending upon the temperature in the bonnet, or the temperature of the bonnet of the furnace, and there is no tendency to overrun the temperature desired in the rooms heated, because the speed of operation of the circulating fan is continuously varied with the bonnet temperature, and diminishes as the temperature of the furnace bonnet or the air in the bonnet decreases.

I have found that air which is warmer than the body temperature may actually feel cooler when it is subjected to circulation, on account of the tendency of the moving air to carry away the vapors which are passed off by the skin, and therefore it is not desirable to circulate air which is only slightly warmer than the body temperature at a high speed, as must be done with the systems of the prior art, where the fan speed is required to be set at a value which is sufficient to take care of the maximum heating load.

I have also found that air which is at a temperature of from 100 degrees F. to 110 degrees F. still feels warm when it is circulating at a relatively low speed, and there is no cold air blast effect in my heating system which is operated under these conditions.

Therefore, another object of the invention is the provision of an improved heating system which is adapted to circulate the air at a speed and in a volume which is dependent upon the temperature of the circulating air so that blasts of air which feel cold may be avoided under all conditions and so that the circulation of the air in the system may be accomplished for a longer period of time and more nearly continuously to avoid stratification, or what is called a "low seventy" at certain parts of the rooms which are being heated.

According to the present invention, with the improved thermally controlled variable speed pulley of my invention, the pulley may start at a slow speed, and the thermal control for the switch, which controls the fan motor, may be set relatively low, at, for example, from 100 degrees F. to 110 degrees F.

This still feels warm, as the fan is only moving a small volume of air, but as the furnace heats up and the temperature of the air in the bonnet increases, the speed of the fan may be increased by the thermally controlled pulley, so that heated air is taken away more rapidly from the furnace and the heat produced by the burner is distributed more quickly when there is more heat to be distributed.

Under these operating conditions the furnace may operate at a lower temperature and there will be less heat lost in the cellar and less heat lost up the furnace stack. For example, suppose there is an upstairs demand of from 5 to 10 degrees in the morning, as there might be, this requires a greater temperature at the bonnet of the furnace, and the bonnet temperature may go up to 150 or 165 degrees F. According to the present system, the blower speed is then automatically increased as the bonnet heats up.

Another object of the present invention is the provision of an improved variable speed pulley and heating system in which the speed of operation of the circulating fan is increased automatically to compensate for any increased filter resistance. The accomplishment of this result may be analyzed as follows:

The heat input of the furnace may be assumed to be constant, and the transfer effectiveness of the furnace constant. Increased filter resistance, which is caused by filling up of the filter with dust or other foreign material, permits less air to pass through the filter and less heat is carried away from the bonnet. The furnace bonnet becomes hotter, and therefore the thermostat, which controls the pulley according to the present invention, increases the effective diameter of the pulley, increases the speed of operation of the fan, and thus automatically offsets the increased filter resistance by a higher fan speed.

Another object of the invention is the provision of an improved heating system in which the circulating fan may continue to circulate air at a low temperature continuously or almost continuously, so as to avoid stratification.

Another object of the invention is the provision of an improved thermally controlled variable speed fuel and heating system which is adaptable to heat anticipation controls. For example, I have found that the heat anticipation controls of the prior art will turn the burner on several times and then turn it off without the fan operating. This is not efficient because the heat which is produced during this intermittent operation of the burner, without fan operation, is not conveyed to the rooms to be heated.

One partial solution of such a difficulty would be the provision of a two-speed motor system, but such two-speed motor systems would be expensive and at best provide only a partial solution of the difficulty.

Therefore, another object of the invention is the provision of an improved thermally controlled variable speed pulley for heated air circulating systems, which provides a substantially continuous modulation of the fan speed, depending upon the temperature of the air to be circulated.

The volume of the blower increases with the square of the speed, and it is found that changes in volume may be made practically proportional to changes in temperature so that the relation between volume and temperature may be represented, for all practical purposes, as a straight line curve.

Since simplicity and freedom from maintenance are highly important factors in all heating systems, it is advisable to avoid complicated controls and connections which would be subject to clogging or leakage or change in adjustment which would affect the operation of the system.

Another object of the invention is the compensation of the speed of a driven belt by means of bimetallic heat sensitive members mounted to control the effective diameter of a variable speed pulley.

Other objects and advantages of the invention will be apparent from the following description and the accompanying drawings, in which similar references indicate similar parts throughout the several views.

Referring to the drawings, of which there are two sheets:

Fig. 1 is a diagrammatic illustration of a heating system embodying a variable speed pulley constructed according to the present invention;

Fig. 2 is a view in side elevation of a thermostatically operated variable speed pulley illustrated in Fig. 1, showing a fragment of a motor shaft, motor housing, and belt;

Fig. 3 is a longitudinal sectional view taken on the plane of the line 3—3 of Fig. 2, with the pulley parts in separated position; and Fig. 4 is an end view showing the right-hand end of the structure illustrated in Fig. 2.

Referring to Fig. 1, 20 indicates diagrammatically a heating system comprising a hot air furnace 21, provided with an outer housing 22, forming a plenum chamber 23, and provided with a bonnet 24.

The plenum chamber is connected with the rooms to be heated by the usual cold air ducts 25, which lead to the ventilation fan 26, preferably of the centrifugal type, and the outlet of the fan 26 is connected by a cold air duct 27 to the plenum chamber 23.

Heated air is taken off from the bonnet 24 through a plurality of hot air ducts 28 leading to the rooms.

The centrifugal fan 26 includes the usual centrifugal impeller, mounted upon a shaft 29, the shaft being provided with a sectional V pulley 30.

The belt 33 may be held under resilient tension in any suitable manner, such as by means of a pivoted motor mounting including the base 34 and the support 35.

In the embodiment illustrated, the base 34 of the motor 32 is pivotally mounted at 36 on the support 35 so that the weight of the motor tends to maintain the belt 33 under suitable tension.

The motor shaft 37 is provided with a thermostatically controlled variable diameter pulley, indicated in its entirety by the numeral 38.

The thermostatic element 39 is subjected to heated air from the bonnet 24 by means of a conduit 40, which extends from the bonnet 24, downward to the thermostat 39, and discharges against the thermostat 39 at the discharge opening 41.

Other modes of making the thermostat responsive to the bonnet temperature comprise the use of thermostatic devices secured to the metal of the bonnet or placed inside of the bonnet, but the present system is preferred because the motor may be substantially isolated from the hottest parts of the furnace and kept in a cooler condition.

The variable speed pulley 38 comprises a pair of movable pulley sections 42 and 43, one of which, 42, is fixedly secured to the motor shaft 37 by a key or a set screw 44 mounted in a threaded bore 45.

The motor is preferably a substantially constant speed motor which would drive the fan 26 at a substantially constant speed, irrespective of the load on the fan, within certain predetermined limits.

The pulley section 42 may comprise a metal member made of suitable material, such as steel, or it may, in some embodiments, be made of fibrous material, such as molded phenolic condensation products.

The pulley section 42 is preferably provided with a centrally located cylindrical hub 46, having an axially extending cylindrical bore 47 for receiving the motor shaft 37.

At the left end in Fig. 2, the pulley section may have a flat face 48, but on its right side and outside of the hub 46 it is provided with a frusto-conical surface 49, forming one side of a substantially V-shaped groove 50.

The pulley section 43 may comprise a member of similar material, having a frusto-conical surface 51, sloping away from the frusto-conical surface 49, so as to form the V-shaped groove 50. The member 43 has an integrally formed cylindrical flange 53, which forms with a right-hand face of the member 43, as illustrated in Figs. 2 and 3, a cylindrical cupped opening 52.

A disc 55 is mounted on the hub 46 of the pulley member 42 and preferably has a close press fit thereon, so as to avoid the possibility of vibration and to provide a firm support for the thermostatic element 39, which it carries. The disc 55 has a slidable fit in the cup-shaped opening 52 of the member 43.

The frusto-conical surface 49 and flat surface 48 of the section 42 may terminate in an annular ridge or at a cylindrical surface 28, at the periphery of the pulley section 42. In a similar manner there may be a cylindrical surface 56 at the periphery of the pulley section 43.

The hub 46 of the pulley section 42 may be provided with a pair of oppositely located and diametrically extending threaded bores 57, 58 for receiving the screw bolts 59, 60. The screw bolts 59 and 60 also penetrate the disc 55 securely to position the disc on the hub 46. These screw bolts may be utilized for supporting a yoke 61, which may be of substantially U shape, having a pair of legs 62, 63 joined by an end portion 64. The yoke or thermostat-supporting member 61 has a bore 65 in each of its legs 62, 63 for receiving the screw bolts 59 and 60, whereby the yoke 61 is fixedly secured to the disc 55.

The flange 53 of the right pulley section is preferably provided with the axially extending slots 66 for slidably receiving the legs 62, 63 of the yoke 61. The walls 67 and 68 of slot 66 have a suitable tolerance with respect to the legs 62, 63 of the yoke 61, to permit a sliding movement, and the pulley section 43 is thus slidably mounted on the hub of the pulley section 42, but any substantial amount of rotation is prevented between these pulley sections.

It will be noted that the hub 46 of the pulley section 42 is relatively long, and that the pulley 43 has a combined slidable bearing with respect to this hub, whereby the central opening in the portion 43 is directly mounted for slidable movement on the hub 46; and the flange 53 is slidably mounted with respect to the disc 55, which in turn is fixedly supported on the hub 46, so that there is very little possibility of any tilting of the pulley section 43 on the pulley section 42, due to the action of V belt 33, which usually engages over slightly more or slightly less than half of the pulley at one time.

The belt 33, which has been termed a V belt, is preferably substantially trapezoidal in section, being provided with the outer cylindrical surface 70, inner cylindrical surface 71, and lateral cylindrical surfaces 72 and 73.

The axial dimension between the frusto-conical surfaces 72 and 73 is preferably relatively large so that these frusto-conical surfaces of the belt may engage the surfaces 49 and 51 on the pulley sections over a wider range of movement of the pulley.

The taper of the belt-engaging parts 49 and 51 of the pulley sections makes the engaging surfaces farther apart at larger effective diameters, and the provision of a belt of suitable dimensions in an axial direction permits the engagement of the belt with the frusto-conical surfaces on the pulley sections at greater effective diameters.

As such belts are customarily called V belts in the trade, I employ the term V belt throughout this specification and claims to include not only a belt of actual V cross-section, but a belt of the type illustrated, in which the inner ridge of the V has been eliminated, so that the belt is actually trapezoidal in cross-section.

The thermostatic controlling device 39 may consist of a plurality of U-shaped bimetallic thermostatic elements 75. The bimetallic elements 75 may be of a conventional commercial construction, consisting preferably of two closely joined strips of metal of different coefficients of thermal expansion. The metal of the larger coefficient of thermal expansion is arranged on the inside, in the embodiment illustrated, so that the U-shaped bimetallic thermostats 75 tend to expand or straighten under an increase in temperature from the position of Fig. 3 to that of Fig. 2.

In the illustrated embodiment, the outer ends of the thermostatic members 75 are arranged in complementary manner, as illustrated in Fig. 4, and are secured to the yoke 61 as by means of rivets 76.

The opposite ends of the bimetallic elements 75 may bear loosely against, or be secured to, a pressure plate 77 which has its face surface 78 engaging the annular end surface 79 of the flange 53 carried by the member 43. The pressure plate 77 is dished at 81 to provide space for rivets 80 where rivets are used.

The yoke 61 may be provided with suitable permanent stops for limiting the spreading of the pulley sections 42, 43 by having the ends of the legs 62, 63 of reduced width as at 86 to provide stop shoulders 82, 83. The device may also be provided with suitable adjustable stop means, comprising a pair of sheet metal stop members 84 which are identical in shape and which are slidably mounted on the screw bolts 59 and 60 by means of slots 85.

Each of these stop members 84 comprises a substantially rectangular strip of metal of the same width as the reduced width portions 86 of the legs 62 and 63. The stop members 84 may have laterally extending portions 87 at each side, provided with depending guide flanges 88 at each side.

The guide flanges 88 engage the sides of the legs 62, 63 and prevent rotation of the stop member 84 on screw bolts 59, 60. Thus the range of spread of the pulley sections 42 and 43 may be adjusted, and the device may be used with smaller belts; that is, belts of less width in axial direction than that shown.

In the normal or cold position of the parts as illustrated in Fig. 3, the bimetal strips are in a contracted or maximum bowed condition to move the plate 77 to the right into contact with the stop 84 or the notches 82 and 83 in the legs 61. This action permits the pulley parts 42 and 43 to move to their maximum degree of separation, under the action of the belt 33. At this point further separation is prevented, both by the engagement of the plate 77 with the stops 84, or the notches 82, 83, and by the contact of the face of the member 43 with the disc 55. It will be noted that the stops 84 are illustrated in their extreme outward position of adjustment in both Fig. 2 and Fig. 3.

Fig. 2 shows, in dotted lines, the relative positions of the flange 53, the pulley member 43, and the disc 55 when the thermostatic members 75 are expanded or partially straightened under the influence of increased temperature. In this position the pressure of the plate 77 on the flange 53 moves the pulley member 43 toward the left, the movement being limited by the engagement of the member 43 with the member 42. This action increases the effective diameter of the pulley with respect to the belt 33.

The thermostatic elements 75 are preferably symmetrically arranged with respect to the axis of the pulley and are equally spaced from each other annularly. If the pulley is to operate at high speeds where dynamic forces become a material factor, the parts should be dynamically balanced. The method of balancing can be similar to that used for balancing fans and blower wheels, which methods are well known to those familiar with the art.

The effective pulley diameter is dependent upon the temperature to which the thermostats are subjected, and the taper of the belt-engaging surfaces on the pulley and the characteristics of the thermostats may be made such that the variation in speed is substantially proportional to the variation in temperature, by which I mean that the temperature speed relation may be expressed substantially as a straight line curve over a predetermined range of operation.

Upon a cooling down of the thermostat, the action of the belt and the belt-tensioning arrangement tends to force the pulley sections apart to follow up the contraction of the bi-metal strips, and the effective diameter of the V pulley is at all times dependent upon the temperature to which the thermostatic elements are subjected.

The operation of the present variable speed pulleys in a heating system of the type shown in Fig. 1 is as follows: When such pulleys are employed, the critical operating bonnet temperature for the thermostatic device controlling the fan motor 32 may be set at a lower temperature, such as, for example, 100 to 110 degrees. When the bonnet reaches this temperature, the fan is turned on; but due to the fact that the parts of the pulley are in the position of Fig. 3, the effective diameter of the driving pulley is at a minimum, and the fan thus operated at a low speed, such as, for example, 275 R. P. M.

When the variable diameter pulley has its thermostatic element at or more than maximum temperature so that parts of the pulley are in the position shown in Fig. 2, the speed of rotation of the fan may be 500 R. P. M., for example. I desire it to be understood, however, that the speeds which are given for examples are not in any sense limits for practical use, as the fan's speed may be made any desired value, and the examples given are merely to show the range which has been found effective in exemplary installations.

Although the air in the bonnet is not at a high temperature, it still feels warm as it emerges from the registers when the fan is moving only a small volume of air and at a low speed. Furthermore, the amount of air moved through the plenum chamber of the furnace is not such that it cools the furnace down too quickly, and the fan will continue to operate, instead of being turned off, as I have found to be the case with the devices of the prior art.

In the arrangements of the prior art I have frequently noted that the fan operating at a maximum speed passes so much cold air through the plenum chamber that the temperature is so reduced that the fan is turned off again. This intermittent action is eliminated by my invention.

As the temperature of the air in the plenum chamber, and of course that discharged on the thermostat 39, by the duct 40, increases in temperature, the speed of the fan is automatically increased by the expansion of the thermostat and the increase in the effective diameter of the driving pulley.

The present heating system permits a continuous and gradual modulation of the fan speed so that the furnace may be operated at a lower temperature and fuel may be saved. The fan may be operated over a longer range of time, or it may be continuously operated at a lower rate of speed so as to avoid stratification and so as constantly to deliver heat from the furnace to the rooms by the moving air.

The speed varying effect of my thermostatically controlled pulley may be accentuated by the use of a belt of constant length and by having the driving and driven shafts at constant spacing, but by using a sectional spring-actuated pulley on the driven member, for taking up the effective length of the belt, which is increased or decreased by the action of the thermostatic pulley. Thus, one pulley would increase in size, while the other decreased, and vice versa, accentuating the speed-changing effect of the thermostatically controlled pulley.

My thermostatically controlled pulley is adapted to be used either as the driving or the driven member, and its thermostatic element may be so arranged that it increases the diameter or decreases the diameter upon increase in temperature.

In addition to its use in a heating system as described, it may be used for controlling the speed of a conveyor for conveying articles through a heated atmosphere. Under such conditions, if the conveyor includes a large number of painted articles, the temperature of the heated atmosphere would naturally drop, due to the absorption of the heat by the articles, and to the increased evaporation of the solvents of the paint.

Under these conditions, and with a decreased temperature, the conveyor should move slower because the paint would require a longer time to dry at a lower temperature, and therefore the conveyor should keep the painted articles on the conveyor a longer period of time.

The same would be true in the case of a baking oven, where my variable speed pulley may be used for automatically compensating the conveyor drive for any drops of temperature. The variable speed pulley may also be used in driving the fuel feed of a stoker, and it is of general application wherever the speed of drive may be advantageously varied responsive to temperature or pressure.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a thermostatically controlled variable-diameter pulley, the combination of a pair of pulley sections, with means for mounting said pulley sections for axial sliding movement relative to each other, said pulley sections being provided with opposed frusto-conical surfaces, forming a pulley groove of variable effective diameter relative to a wedge-shaped belt of constant width, a supporting frame carried by one of said pulley sections, and having an opposed portion located opposite the other pulley sections, and a plurality of bi-metallic thermostatic elements arranged in balanced relation to each other, said thermostatic elements having one end secured to said opposed portion of said frame, and having the other end engaging the other of said pulley sections for effecting a movement of one pulley section relative to the other.

2. In a thermostatically controlled variable-diameter pulley, the combination of a pair of pulley sections, with means for mounting said pulley sections for axial sliding movement relative to each other, said pulley sections being provided with opposed frusto-conical surfaces, forming a pulley groove of variable effective diameter relative to a wedge-shaped belt of constant width, a supporting frame carried by one of said pulley sections, and having an opposed portion located opposite the other pulley sections, and a plurality of bi-metallic thermostatic elements arranged in balanced relation to each other, said thermostatic elements having one end secured to said opposed portion of said frame, and having the other end engaging the other of said pulley sections for effecting a movement of one pulley section relative to the other, said means for slidably mounting said pulley sections comprising an elongated hub on one pulley section and an elongated complementary cylindrical bearing surface on the other of said sections.

3. In a heat-responsive variable-diameter pulley, the combination with a pair of pulley sections, the pulley sections being mounted for sliding movement relative to each other in an axial direction, the pulley sections being provided with opposed diagonally outward sloping belt-engaging surfaces adapted to be moved with the sections to vary the spacing between the sloping surfaces, a thermostatic bi-metal strip fixedly carried by one pulley section and having engagement with the other pulley section to vary the spacing of the sloping surfaces upon an increase in temperature.

4. In a heat-responsive variable-diameter pulley, the combination with a pair of pulley sections, the pulley sections being mounted for sliding movement relative to each other in an axial direction, the pulley sections being provided with opposed diagonally outward sloping belt-engaging surfaces adapted to be moved with the sections to vary the spacing between the sloping surfaces, and thermostatic bi-metal means secured to one of the pulley sections to rotate therewith, the bi-metal means being substantially dynamically balanced with respect to said pulley sections, the bi-metal means having engagement with the other pulley section than that to which it is secured to vary the spacing of the sloping surfaces upon an increase in temperature.

5. In a heat-responsive variable-diameter pulley, the combination with a pair of pulley sections, the pulley sections being mounted for sliding movement relative to each other in an axial direction, the pulley sections being provided with opposed diagonally outward sloping belt-engaging surfaces adapted to be moved with the sections to vary the spacing between the sloping surfaces, a resilient thermostatic bi-metal strip secured to one pulley section and having resilient engagement endwise of the other pulley section, resiliently to urge the pulley sections relatively to each other in an axial direction upon a predetermined change in temperature.

6. In a heat-responsive variable-diameter pulley, the combination with a pair of pulley sections, the pulley sections being mounted for sliding movement relative to each other in an axial direction, the pulley sections being provided with opposed diagonally outward sloping belt-engaging surfaces adapted to be moved with the sections to vary the spacing between the sloping surfaces, one of said pulley sections having a hub with a portion of large diameter and a second portion of relatively smaller diameter, the other pulley section having an axial bore having portions of different diameters adapted slidably to receive both of said first hub portions therein, thermostatic bi-metal means mounted beyond an end of said pulley sections, the bi-metal means having compressive engagement with one of said pulley sections and having tensile engagement with the other pulley section to vary the spacing of the sloping surfaces upon an increase in temperature.

7. In a heat-responsive variable-diameter pulley, the combination with a pair of pulley sections, the pulley sections being mounted for sliding movement relative to each other in an axial direction, the pulley sections being provided with opposed diagonally outward sloping belt-engaging surfaces adapted to be moved with the sections to vary the spacing between the sloping surfaces, one pulley section having an elongated hub and the other pulley section having a bore slidably to receive said hub therein, and a thermostatic bi-metal member secured to the hub of the first pulley section and positioned to engage an end of the second pulley section to vary the spacing of the sloping surfaces upon an increase in temperature.

8. In a heat-responsive variable-diameter pulley, the combination with a pair of pulley sections, the pulley sections being mounted for sliding movement relative to each other in an axial direction, the pulley sections being provided with opposed diagonally outward sloping belt-engaging surfaces adapted to be moved with the sections to vary the spacing between the sloping surfaces, a frame fixedly connected to one pulley section, and a thermostatic bi-metal strip mounted between the frame and the other pulley section to exert pressure on said other pulley section and to exert tension on the frame upon a change in temperature to vary the spacing of the sloping surfaces.

9. In a heat-responsive variable-diameter pulley, the combination with a pair of pulley sections, the pulley sections being mounted for sliding movement relative to each other in an axial direction, the pulley sections being provided with opposed diagonally outward sloping belt-engaging surfaces adapted to be moved with the sections to vary the spacing between the sloping surfaces, a frame carried by one pulley section and projecting beyond the end of the pulley sections, the frame being mounted in dynamic balance with the pulley sections, and a thermostatic bi-metal element mounted between the frame and an end of the other pulley section than that carrying the frame, to vary the distance between the frame and the other pulley section upon a change in shape of the bi-metal, caused by an increase in temperature, to vary the spacing of the sloping surfaces.

10. In a heat-responsive variable-diameter pulley, the combination with a pair of pulley sections, the pulley sections being mounted for sliding movement relative to each other in an axial direction, the pulley sections being provided with opposed diagonally outward sloping belt-engaging surfaces adapted to be moved with the sections to vary the spacing between the sloping surfaces, a frame rigidly secured to one pulley section to project beyond the ends of said pulley sections, the frame having a surface opposed to an end of the other pulley section than that carrying the frame, a portion of the frame being positioned in a path of movement of said other pulley section to limit the sliding movement of the pulley sections relatively to each other, a thermostatic bi-metal element mounted between the opposed frame surface and said other pulley section to vary the spacing of the sloping surfaces upon an increase in temperature.

11. In a heat-responsive variable-diameter pulley, the combination with a pair of pulley sections, the pulley sections being mounted for sliding movement relative to each other in an axial direction, the pulley sections being provided with opposed diagonally outward sloping belt-engaging surfaces adapted to be moved with the sections to vary the spacing between the sloping surfaces, one pulley section having a notched opening therein, a frame secured to the other pulley section within the area defined by the notch to be slidable in a direction axially of the pulley sections, the frame and a part of the pulley defining a side of the notch having opposed surfaces positioned to limit relative movement of the pulley sections in an axial direction, the frame and a part of the pulley defining another side of the notch having other opposed surfaces to limit relative rotation between the pulley sections, and a thermostatic bi-metal strip mounted between the frame and the other pulley section than that carrying the frame to vary the spacing of the sloping surfaces upon an increase in temperature.

12. In a heat-responsive variable-diameter pulley, the combination with a pair of pulley sections, the pulley sections being mounted for sliding movement relative to each other in an axial direction, the pulley sections being provided with opposed diagonally outward sloping belt-engaging surfaces adapted to be moved with the sections to vary the spacing between the sloping surfaces, a frame secured to one of the sections to span the axis of the pulley sections beyond an end of said sections, a support carried by the other pulley section than that to which the frame is secured, the support extending between the frame and the section carrying the frame, and a thermostatic bi-metal member mounted between the frame and the support to vary the spacing of the sloping surfaces upon an increase in temperature.

13. Variable pulley operating means comprising, in combination with a variable diameter pulley having a pair of pulley sections relatively slidable with respect to each other in an axial direction; a thermostatic bi-metal element secured to one pulley section and curved to lie substantially wholly beyond an end of said pulley sections, the bi-metal element having engagement with the other pulley section to move the pulley sections relatively with respect to each other in an axial direction upon an increase in temperature.

14. Variable pulley operating means comprising, in combination with a variable-diameter pulley having a pair of pulley sections relatively slidable with respect to each other in an axial direction; a frame secured to one pulley section to span the space beyond an end of said pulley sections, the frame being detachable from said pulley section, and a bi-metal member carried by the frame and having endwise engagement with the other pulley section to move the pulley sections relatively with respect to each other in an axial direction upon an increase in temperature.

15. Variable pulley operating means comprising, in combination with a variable diameter pulley having a pair of pulley sections relatively slidable with respect to each other in an axial direction; a frame detachably secured to one pulley section to span the space beyond an end of said pulley sections, the frame being mounted in dynamic balance with the pulley sections, and a curved bi-metal member secured to the frame and having endwise engagement with the other pulley section to move the pulley sections relatively with respect to each other in an axial direction upon an increase in temperature.

16. In a heat-responsive variable-diameter pulley, the combination with a pair of pulley sections, the pulley sections being mounted for sliding movement relative to each other in an axial direction, the pulley sections being provided with opposed diagonally outward sloping belt-engaging surfaces adapted to be moved with the sections to vary the spacing between the sloping surfaces, a resilient thermostatic bi-metal strip secured to one pulley section and having resilient engagement endwise of the other pulley section, resiliently to urge the pulley sections relatively to each other in an axial direction upon a predetermined change in temperature, and stop means carried by one of said pulley sections and adjustably mounted thereon to limit the relative movement of said pulley sections in one direction.

17. In a heat-responsive variable-diameter pulley, the combination with a pair of pulley sections, the pulley sections being mounted for sliding movement relative to each other in an axial direction, the pulley sections being provided with opposed diagonally outward sloping belt-engaging surfaces adapted to be moved with the sections to vary the spacing between the sloping surfaces, a frame fixedly connected to one pulley section, and a thermostatic bi-metal strip mounted between the frame and the other pulley section to exert pressure on said other pulley section and to exert tension on the frame upon a change in temperature to vary the spacing of the sloping surfaces, means for preventing relative rotation between said pulley sections, and means for limiting the spreading movement of said pulley sections, said latter means being adjustably mounted on one of said pulley sections.

18. In a variable-diameter pulley, the combination of a pair of pulley sections, said pulley sections being provided with opposed diagonally outward sloping belt-engaging surfaces, the first of said pulley sections having an elongated hub, and the other of said pulley sections being slidably mounted on said hub, a frame mounted on the first of said sections, and extending axially of said pulley, a plurality of resilient bowed members carried by said frame at one of their ends, and having the opposite end secured to a pressure plate adapted to act on the other of said sections, said pressure plate being slidably mounted on said frame, and said bowed members being symmetrically arranged around the axis of said pulley for dynamic balance whereby said bowed members may act on said pulleys to urge them together, and a V-belt in the pulley may act on the pulleys against the pressure of said bowed members to spread the pulleys.

WILLIAM W. HALLINAN.